Dec. 18, 1962  C. A. WERTMAN  3,068,727
MULTIPLE CUTTING TOOL HEAD
Filed July 12, 1961

INVENTOR.
Charles A. Wertman.
BY

United States Patent Office 3,068,727
Patented Dec. 18, 1962

3,068,727
MULTIPLE CUTTING TOOL HEAD
Charles A. Wertman, 14266 Young Ave., Detroit, Mich.
Filed July 12, 1961, Ser. No. 123,549
3 Claims. (Cl. 77—58)

This invention relates to multiple cutting tool heads, more particularly to boring heads, and is directed to a simple and efficient form of two-speed head adapted to the simultaneous machining of both small and larger diameter surfaces in a piece of work, while providing a differential rotational speed of the tool bits as applied to the smaller and larger diameters while at the same time maintaining a substantially equal surface speed per minute of the said tool bits.

As is well known to those familiar with such tools, the most efficient surface speed is dependent upon many variables, such as composition and hardness of material, the nature of the material being machined, the efficiency of coolant fluid, quality of finished surface required and so forth.

Consequently, where surfaces of widely differing diameters are to be simultaneously machined with the tool bits operating at the same revolutions per minute, it has been necessary or desirable to use tool bits of different composition as a compromise to meet the difference in surface speed obtaining at these different diameters; such as by using a tungsten-carbide tool with an efficiency rating of say, 200 surface feet per minute for the larger diametering machining and a high-speed steel tool bit having a lower surface-feet per minute rating for the smaller diameter.

Where these diameters vary considerably, it is not always possible or convenient to provide tool bits of a precisely correct surface-speed rating to meet the conditions imposed and some compromise must be accepted, with consequent loss of efficiency in time involved, wear on the tool bits, or finish attained in the machining operation.

It is, therefore, an important object of the present invention to provide a simple and efficient two speed boring or machining head in which inner and outer concentric rotary bit-carrying members are geared together to operate at differing rotational speeds whereby to provide the proper related surface-speed per minute of the tool bits operating on these differing diameters.

A further object is to provide, for the purposes referred to, an arrangement of gearing incorporated in the head whereby the drive on that portion of the head carrying the tool bits for one diameter of work is transmitted to that portion of the head carrying the tool bits for a differing diameter in a manner effecting a slower rotational speed for the larger than for the smaller diameter of work; and, more particularly, to the incorporation in the said head of a system of planetary gearing to secure that result.

The invention still further contemplates an arrangement of planetary gearing in the head whereby an opposite direction of rotation between the tool bits for the smaller and the larger diameters may be attained.

In carrying the said invention into effect, I may adopt the novel construction and arrangement of parts hereinafter described, by way of example, having reference to the accompanying drawing, wherein.

Similar characters of reference indicate similar parts of the several figures of the drawing.

Figure 1:
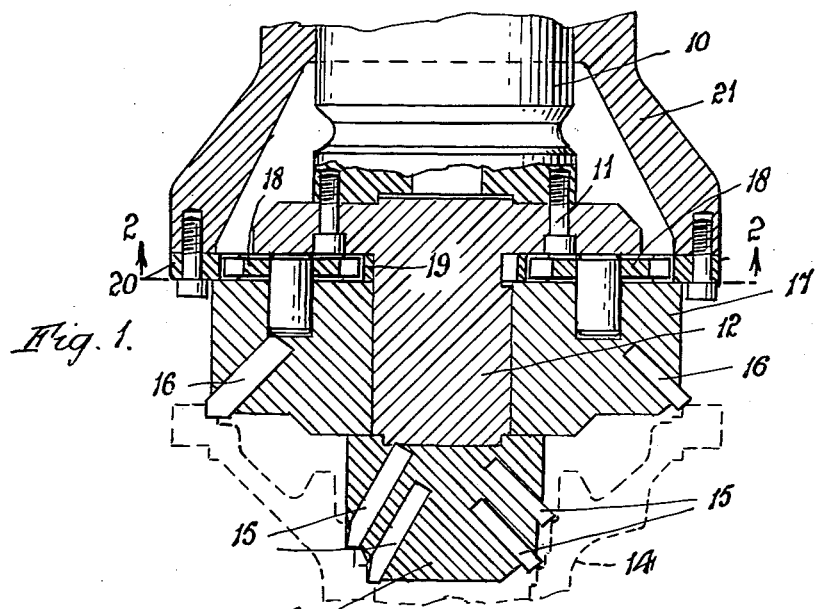
FIGURE 1 is a sectional elevation of a boring head embodying the said invention.
Figure 2:
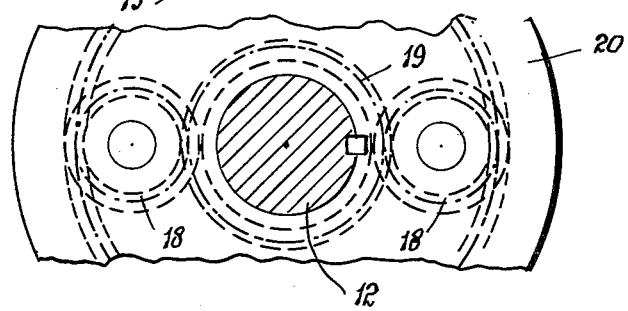
FIGURE 2 is a somewhat schematic transverse section of the same, taken on a plane indicated by the line 2—2 in FIGURE 1, to illustrate the gearing arrangement.

Referring first to FIGURES 1 and 2, 10 is the rotary boring spindle to the end of which is attached as by bolts 11, the extension 12 which has a tool holder 13 suitably secured to the end thereof. 14 indicates a workpiece on which various relatively small diameter shoulders are to be machined by the cutting tools 15 mounted in the said tool holder 13. Obviously these cutting tools are rotated at the same speed as the spindle 10.

The said workpiece 14 has second surfaces of large diameter to be machined by the cutting tools 16 which, in order to operate at approximately the same surface-speed per minute as the cutting tools 15, must be rotated at a correspondingly slower speed, which effect is obtained by mounting the cutters 16 in a tool holder in the form of our annulus 17, which is rotatable about the member 12 through the medium of planetary pinions 18 meshing with a sun gear 19, keyed to the same member 12, and with the ring gear 20 carried by the stationary housing or shell 21.

Thus, the well known operation of this planetary gear system will result in a slower rotation of the annulus 17 relative to that of the tool holder 13, the ratio of the gears 18, 19 and 20 being determined to meet the rotary ratio desired between the tool holders 13 and 17.

The housing or shell 21 may be held stationary by clamping or otherwise to any convenient part of the boring machine.

Figure 3:
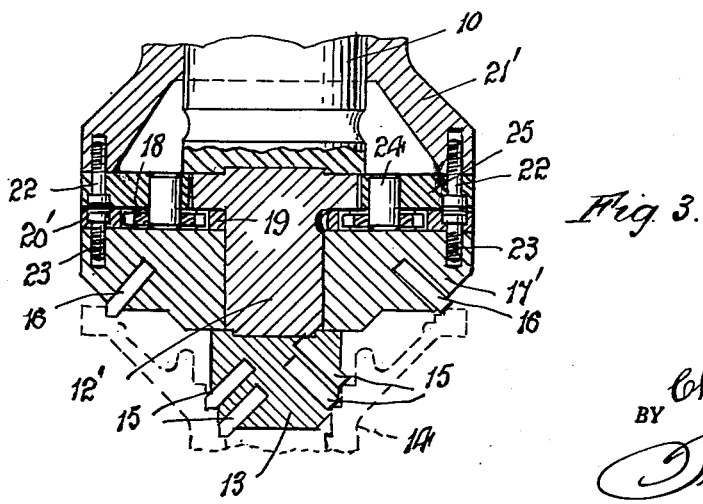
FIGURE 3 is a similar view to FIGURE 1 illustrating a modified form of the device.

In the foregoing instance the tool holders 13 and 17 are rotated in the same direction, although at different speeds, and, in FIGURE 3, a modification is illustrated wherein the two tool holders may be rotated in opposite directions where deemed necessary or desirable.

In the case of this example, FIGURE 3, the internal ring gear 20' is coupled to the tool holding member 17' by bolts 23; 18 and 19, being the planetary or sun gears as in the first example. The sun gears in this case are, of course, mounted on spindles 24 carried by a plate 25 affixed to the end of the stationary shell 21', providing a gear train which insures the rotation of the tool holder 17' in an opposite direction to that of the tool holder 13.

In both of these instances the gear ratio may be designed to admit of tools of similar composition or characteristics being used for machining both the smaller and the larger diameters of the workpiece at the same time, due to the surface-speed per minute being maintained approximately the same in spite of the widely different diameters being machined.

In some cases it is advantageous to rotate the boring tools for the different diameters in opposite directions, such as to meet conditions where harmonic vibrations or chatter may be otherwise developed.

The present invention provides a boring head which may be applied to a single spindle of a machine to obtain the results outlined and thus eliminate the necessity for expensive and complicated drives and gearing within the machine for such purpose, or the provision of multiple or concentric spindles such as have been heretofore designed into boring and similar machines where differing speeds of rotation have been provided for.

Herein, and in the claims, the term "boring" is intended to be regarded in its broadest sense and is deemed to include the use of various cutting tools for performing similar operations, which may not be regarded strictly in the trade as "boring" operations.

This invention may be developed within the scope of the following claims without departing from the essential features of the said invention, and it is desired that the specification and drawing be read as being merely illustrative of a practical embodiment of the same and not in strictly limiting sense.

What I claim is:

1. A boring head for simultaneously machining circular surfaces of widely varying diameters, comprising a spindle, a small diameter tool holder mounted on said spindle, a large diameter holder in the form of an annulus coaxial with said spindle, a non-rotating housing about the working end of said spindle, a sun gear carried by said spindle, planetary pinions carried by one of said holders, and an internal ring gear controlling the planetary operation of said pinions whereby to substantially equalize the working surface-speed per minute of said holders.

2. A boring head for simultaneously machining circular surfaces of widely varying diameters, comprising a spindle, a small diameter tool holder mounted on said spindle, a large diameter holder in the form of an annulus coaxial with said spindle, a non-rotating housing about the working end of said spindle, a sun gear carried by said spindle, planetary pinions carried by said large holder, and a fixed internal gear carried by said housing.

3. A boring head for simultaneously machining circular surfaces of widely varying diameters, comprising a spindle, a small diameter tool holder mounted on said spindle, a large diameter holder in the form of an annulus coaxial with said spindle, a non-rotating housing about the working end of said spindle, a sun gear carried by said spindle, an internal ring gear carried by said large holder, and pinions coupling said gears, said pinions carried by said fixed housing.

References Cited in the file of this patent
UNITED STATES PATENTS
2,345,403     McGrew _____ Mar. 28, 1944
FOREIGN PATENTS
541,007     Italy _____ Mar. 20, 1956